United States Patent [19]

Schreckenberg et al.

[11] 4,430,492

[45] Feb. 7, 1984

[54] HIGH-MOLECULAR, SEGMENTED, THERMOPLASTICALLY PROCESSABLE, AROMATIC POLYCARBONATES CONTAINING CO-CONDENSED DIMERIC FATTY ACID ESTERS, THEIR PREPARATION AND THEIR USE

[75] Inventors: Manfred Schreckenberg, Krefeld; Hans-Heribert Burgdörfer, Cologne; Rolf Dhein, Krefeld; Gottfried Schneider, Leverkusen, all of Fed. Rep. of Germany

[73] Assignee: Bayer Aktiengesellschaft, Leverkusen, Fed. Rep. of Germany

[21] Appl. No.: 182,264

[22] Filed: Aug. 28, 1980

[30] Foreign Application Priority Data

Aug. 31, 1979 [DE] Fed. Rep. of Germany ....... 2935317

[51] Int. Cl.³ .............................................. C08G 63/62
[52] U.S. Cl. ...................................... 528/176; 528/173; 528/174; 528/191; 528/193; 528/196; 528/202; 528/204
[58] Field of Search ............. 260/18 TN, 22 R, 22 D; 528/176

[56] References Cited

U.S. PATENT DOCUMENTS

| 3,030,335 | 4/1962 | Goldberg | 260/47 |
| 3,157,606 | 11/1964 | Deanin | 260/18 TN |
| 3,161,615 | 12/1964 | Goldberg | 260/47 |
| 3,169,121 | 2/1965 | Goldberg | 260/47 |
| 3,189,662 | 6/1965 | Vaughn | 260/824 |
| 3,287,442 | 11/1966 | Caldwell et al. | 260/858 |
| 3,493,534 | 2/1970 | Coury | 260/47 |
| 3,549,570 | 12/1970 | Coury | 260/18 TN |
| 3,821,325 | 6/1974 | Merritt, Jr. et al. | 260/824 |
| 3,998,908 | 12/1976 | Buxbaum | 260/860 |
| 4,169,868 | 10/1979 | Schreckenberg | 525/439 |
| 4,216,298 | 8/1980 | Schreckenberg | 525/439 |
| 4,217,297 | 8/1980 | Lindner | 525/439 |
| 4,281,101 | 7/1981 | Schreckenberg | 528/196 |

FOREIGN PATENT DOCUMENTS

| 2736417 | of 0000 | Fed. Rep. of Germany . |
| 2827325 | of 0000 | Fed. Rep. of Germany . |
| 1395469 | of 0000 | Japan . |
| 965085 | 7/1964 | United Kingdom . |
| 1139412 | of 0000 | United Kingdom . |
| 1139413 | of 0000 | United Kingdom . |

OTHER PUBLICATIONS

Polyurethanes Chemistry and Technology, Part I, Saunders and Frisch, p. 50.

Primary Examiner—Paul R. Michl
Attorney, Agent, or Firm—Gene Harsh; Lawrence S. Pope; Aron Preis

[57] ABSTRACT

The present invention relates to polycarbonate compounds characterized in that dimeric fatty acid ester soft segments are co-condensed therein. The invention further relates to processes for preparation of these compounds and their use in films and molded articles.

7 Claims, No Drawings

HIGH-MOLECULAR, SEGMENTED, THERMOPLASTICALLY PROCESSABLE, AROMATIC POLYCARBONATES CONTAINING CO-CONDENSED DIMERIC FATTY ACID ESTERS, THEIR PREPARATION AND THEIR USE

SUMMARY OF THE INVENTION

The present invention relates to high-molecular, segmented, thermoplastically processable aromatic-polycarbonates characterized by its co-condensed dimeric fatty acid ester segments having an average molecular weight Mn (number-average) between 800 and 20,000 and to a process for their preparation.

BACKGROUND OF THE INVENTION

Thermoplastically processable, high-molecular, segmented, aromatic polycarbonate elastomers containing a variety of soft segments and their preparation processes are known (see, for example, U.S. Pat. No. 3,161,615, U.S. Pat. No. 3,030,335, U.S. Pat. No. 3,287,442, U.S. Pat. No. 3,189,662, U.S. Pat. No. 3,169,121, German Auslegeschrift 1,162,559, German Offenlegungsschrift 2,411,123, German Offenlegungsschrift 2,636,783, German Offenlegungsschrift 2,702,626, German Offenlegungsschrift 2,636,784, German Offenlegungsschrift 2,726,416, German Offenlegungsschrift 2,726,376, German Offenlegungsschrift 2,726,417, and German Patent Application P 28 27 325.

The products are thermoplastically processable and, because of their soft segments such as aliphatic polyethers, aliphatic polyesters, aliphatic polycarbonates or polysiloxanes, are characterized by their elasticity. The elasticity of these products depends on the ratio between the aromatic polycarbonate hard segments and the aliphatic soft segments such that the elasticity and elongation at break increase with the proportion of soft segment increase. These products also have a high heat distortion temperature resulting from the crystalline aromatic polycarbonate regions which impart to the polymer a high cross-linking density, even at relatively high temperatures. In addition, these polycarbonate elastomers can also be used to obtain products with a comparatively low heat distortion point resulting from a clear amorphous phase separation of the hard segment from the soft segment.

The disadvantage of almost all these products is that the aromatic polycarbonate hard segments, which impart to the polymer the high heat distortion temperature, do not form a separate phase sufficiently rapidly after thermoplastic processing and the products thus tend to stick to one another; the tackiness can be eliminated by additional processing steps such as, by subjecting the products to a heat treatment or to a drawing and a heat treatment after the thermoplastic processing. There is therefore a considerable expenditure of effort and expense associated with freeing these products from tackiness.

It has now been found, surprisingly, that aromatic polycarbonate elastomers which contain at least 5% by weight of co-condensed dimeric fatty acid esters as soft segments are no longer tacky after thermoplastic processing. It is particularly surprising that these products feature separate phases immediately after thermoplastic processing and are flexible also at low temperatures. Such controlled phase separation between the aromatic polycarbonate segments, based, for example, on bisphenol-A polycarbonate, and the polyester segment based on hexane-1,6-diol and dimeric fatty acid, while transparency is retained was hitherto unknown.

The preparation of polyester-polycarbonates from dimeric fatty acid, bisphenol A and phosgene by the pyridine process is in itself known and is described in U.S. Pat. No. 3,169,121, Example 17. The products according to that patent are built up only from dimeric fatty acid blocks with molecular weights of 560. In contrast, the polycarbonates, with co-condensed dimeric fatty acid esters, according to the present invention contain polyester blocks having molecular weights (number-average) $\overline{Mn}$ of 800 to 20,000, preferably 1,000 to 15,000 and in particular 2,000 to 10,000, and diols and are characterized by their separate phases. It is this critical feature which enables their use according to the invention.

The polycarbonates according to the invention containing at least 5% by weight of co-condensed dimeric fatty acid esters can be processed thermoplastically into transparent films, from which bags for packaging biological liquids and parenteral agents can be produced by heat impulse welding. These bags have a sufficiently high heat distortion temperature that they can be sterilized with steam in an autoclave at 121° C.

DETAILED DESCRIPTION OF THE INVENTION

All diphenols are suitable for the preparation of the high-molecular polycarbonate elastomers according to the invention, examples being hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-sulphoxides, bis-(hydroxyphenyl)-sulphones and α,α-bis-(hydroxyphenyl)-diisopropylbenzenes, and nuclear-alkylated and nuclear-halogenated derivatives thereof. These and other suitable aromatic dihydroxy compounds are listed, for example, in U.S. Pat. Nos. 3,271,367 and 2,999,846, and in German Offenlegungsschriften 2,063,050 and 2,211,957.

Diphenols which can be employed according to the invention are, in particular, those of the formula (I)

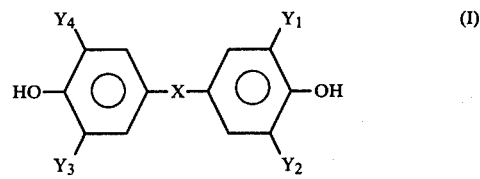

wherein
X denotes a single bond, —CH$_2$—,

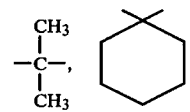

and O, S, SO$_2$ or

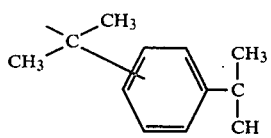

$Y_1$ to $Y_4$ are identical or different and denote hydrogen, $C_1$–$C_4$-alkyl, preferably methyl, or halogen, preferably chlorine or bromine.

Examples of suitable diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)2-methylbutane, 1,1-bis-(3,5-dimethyl-4-hydroxyphenyl)cyclohexane, α,α'-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Preferred diphenols are, for example, 2,2-bis-(4-hydroxyphenyl)-propane, 1,1-bis-(4-hydroxyphenyl)-cyclohexane, 2,2-bis-(3,5-dichloro-4-hydroxyphenyl)-propane, 2,2-bis-(3,5-dibromo-4-hydroxyphenyl)-propane, 2,2-bis-(3,5-dimethyl-4-hydroxyphenyl)-propane, bis-(3,5-dimethyl-4-hydroxyphenyl)-methane and bis-(4-hydroxyphenyl)-sulphide.

It is possible to use either one or a mixture of several of the suitable diphenols.

In addition to the aromatic diphenols, known branching agents with three or more functional groups, in particular those with three or more phenolic hydroxyl groups, can be used in the preparation of the polycarbonates of the invention. The amount of the branching agent added is kept within the amounts known as customary, i.e. between 0.05 and 2 mol %, relative to incorporated diphenols. The preparation of branched polycarbonates is described, for example in German Offenlegungsschrift 1,570,533 and German Offenlegungsschrift 1,595,762, and in U.S. Pat. No. 3,544,514 and U.S. Pat. No. Re. 27,682, all incorporated herein by reference.

Phenols such as p-tert.-butylphenol, p-chlorophenol, 2,4,6-tribromophenol and phenol, can be employed as chain stoppers in the customary amounts, which are determined by the particular molecular weight to be established in the polycarbonate elastomers according to the invention.

Dimeric fatty acid esters which are suitable as segments according to the invention are polyesters which contain aliphatic hydroxyl end groups or aliphatic carboxyl end groups and are obtainable from reacting a dimeric fatty acid having a molecular weight (number-average) $\overline{M}n$ of about 300 to 800, preferably 500 to 600, and a diol. The polyesters can be obtained in known manners, for example in the presence of esterification catalysts, at temperatures between 150° and 200° and at reaction times between 20 and 50 hours. The polyesters containing hydroxyl end groups are obtainable by using an excess amount of diol, relative to the dimeric fatty acid and the polyesters containing carboxyl end groups are obtainable by using an excess of dimeric fatty acid relative to the diol. The dimeric fatty acid esters which are suitable according to the invention have average molecular weights (number-average) $\overline{M}n$ of 800 to 20,000 preferably of 1,000 to 15,000 and in particular of 2,000 to 10,000.

The molecular weight required for the dimeric fatty acid ester is in each case controlled in a known manner by the selected ratio between the diol and dimeric fatty acid.

By dimeric fatty acid there is to be understood the dimerization product of unsaturated fatty acids ($C_{18}$) such as oleic acid, linoleic acid and linolenic acid. The preparation and structure of the dimerized fatty acid is described in J. Am. Chem. Soc. 66, 84 (1944) and in U.S. Pat. No. 2,347,562. Commercially available dimeric fatty acids of various qualities, which differ from each other with respect to the degree of unsaturation and to the monomer and trimer content, may be used. The preferred commercially available dimeric fatty acid compositions are those that are virtually free from monomer and trimer fractions and are completely saturated. A hydrogenated dimeric fatty acid which is prepared, for example, by dimerizing oleic acid and then hydrogenating the product is preferably suitable. Mixtures of dimeric fatty acids and trimeric fatty acids can also be used for this application.

Examples of possible dihydric alcohols are, optionally as mixtures with one another, ethylene glycol, 1,2- and 1,3-propylene glycol, 1,2-, 2,3-, 1,3- and 1,4-butanediol, pentanediols, neopentylglycol, hexanediols, for example, 1,6-hexanediol, trimethylhexanediols, 1,8-octanediols, decanediols, dodecanediols, octadecanediols, 2,2-dimethyl-propane-1,3-diol, 2,2-dimethyl-3-hydroxypropionate, diethylene glycol, triethylene glycol, tetraethylene glycol, dipropylene glycol, tripropylene glycol, tetrapropylene glycol, 1,4-cyclohexanedimethanol, 1,1-cyclohexanedimethanol and perhydrobisphenols, for example 4,4'-(1-methylethylidene)-bis-cyclohexanol and 2,2-bis-(4-(2-hydroxyethoxy)-phenyl)-propane.

Polyhydric alcohols can also be used, such as, for example, glycerol, 1,2,4-butanetriol, trimethylolethane, trimethylolpropane, trimethylolbutane, pentaerythritol, tetroses, di- and tri-methylolpropane, pentoses, 2,2,6,6-tetrakis-(hydroxymethyl)-cyclohexane, hexoses, di-pentaerythritol and tri-pentaerythritol. It is furthermore possible to use ethylene oxide adducts or propylene oxide adducts of such polyols, as long as the average number of carbon atoms per molecule does not exceed 60, and polyethylene glycols, polypropylene glycols and polybutylene glycols.

The dimeric fatty acid esters which are suitable according to the invention and contain carboxyl end groups can be used as such in the preparation of polycarbonates, by the known solution process, that is to say, for example, by the phase boundary process (in this context, see German Offenlegungsschrift 2,636,783 or by the so-called "pyridine process".

The dimeric fatty acid esters which are suitable according to the invention and contain hydroxyl end groups can be used directly as such only for the preparation of polycarbonates by the "pyridine process" (see, for example, Journal of Polymer Science Part e, Polymer Symposia No. 4, 1963, Part 1, pages 707 to 730). To prepare polycarbonates by the phase boundary process, the dimeric fatty acid esters containing hydroxyl end groups must be converted either into dimeric fatty acid esters containing hydroxyaryl carbonate end groups (in this context, see, for example German Offenlegungsschrift 2,726,376 and German Patent Applications P 28 27 325 and P 28 27 526), or into the corresponding bischlorocarbonic acid esters (in this context, see, for example, German Auslegeschrift 1,162,559). The dimeric fatty acid esters containing hydroxyaryl carbonate end groups or chlorocarbonic acid ester end groups can, of course, be also used for the preparation of polycarbonates by the "pyridine process".

The corresponding carboxylic acid halides, in particular carboxylic acid chlorides, of the dimeric fatty acid esters which are suitable according to the invention and contain carboxyl end groups can also be used for the preparation, according to the invention, of the polycarbonates according to the invention.

The dimeric fatty acid esters containing carboxyl end groups can be converted into the corresponding carboxylic acid chlorides by the customary agents, such as, for example, thionyl chloride, $PCl_3$, $PCl_5$ and the like, in a known manner (in this context, see "Organikum" VEB Deutscher Verlag der Wissenschaften, Berlin 1967, 7th Edition, pages 466 to 467).

Examples of dimeric fatty acid esters which are suitable according to the invention and contain hydroxyaryl carbonate end groups are those of the following ideal formulae (II to (IIi)

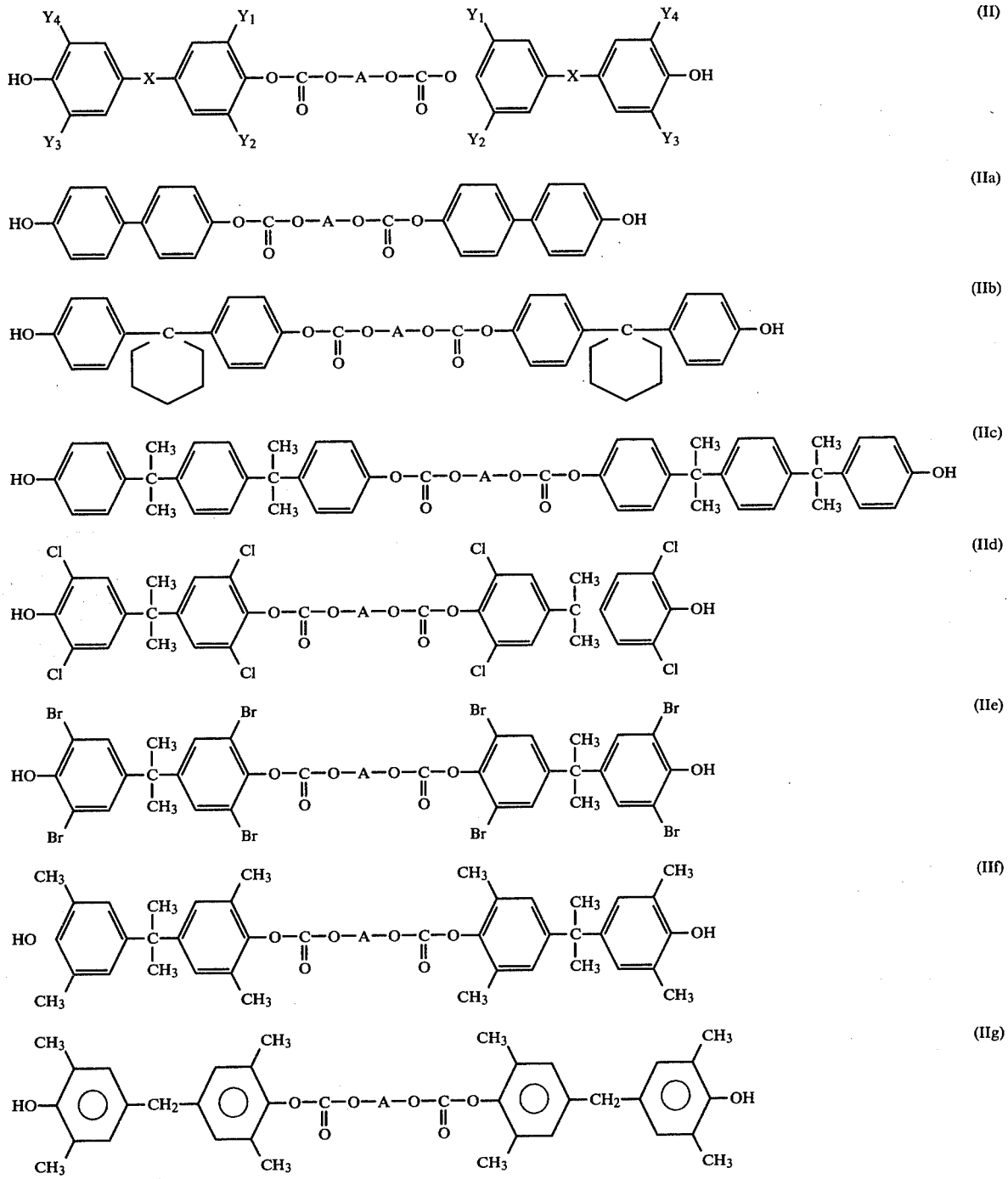

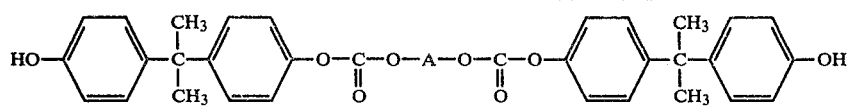

(IIh)

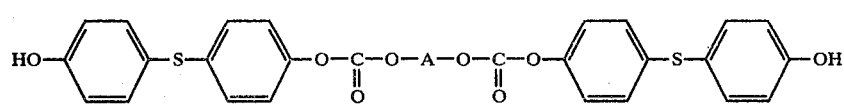

(IIi)

wherein

—O—A—O— is the bivalent diolate radical of a dimeric fatty acid ester which is suitable according to the invention, contains aliphatic hydroxyl end groups and has a $\overline{M}n$ (number-average) of 800 to 20,000, preferably 1,000 to 15,000 and in particular 2,000 to 10,000, and wherein, in formula (II), X and $Y_1$ to $Y_4$ are as defined for formula (I).

Suitable hydroxyaryl carbonate terminated fatty acid esters which contain aliphatic carbonate groups also include those which are obtained by including aliphatic hydroxyl terminated fatty acid esters of the type described hereinabove as an additional reactant in the process described in Offenlegungsschrift 2,827,325. This published German Patent Application teaches the reaction of dihydric alcohols, bisphenols and diphenyl carbonate to yield aliphatic hydroxyaryl terminated polycarbonates suitable as precursors for the preparation of high molecular weight polycarbonate.

The preparation of the polycarbonates according to the invention can essentially be carried out by the two known processes described briefly below (compare H. Schnell, "Chemistry and Physics of Polycarbonates," Polymer Rev., Volume IX, pages 27 et seq., Interscience Publishers).

1. Preparation of a polycarbonate according to the invention in a heterogeneous phase system (phase boundary process).

In this process, diphenols are dissolved in an aqueous alkaline phase, together, if appropriate, with monophenolic chain stoppers and with trifunctional or tetrafunctional branching agents. After adding the dimeric fatty acid ester, containing aliphatic carboxyl end groups or hydroxyaryl carbonate end groups, in a solvent suitable for the polycarbonate, a two-phase mixture is formed, into which phosgene is passed at 0° C. to 60° C. After adding a catalyst, high-molecular-weight polycarbonates containing co-condensed dimeric fatty acid esters are obtained. The mixture is worked up by separating off the organic phase and washing it until neutral and then distilling off the solvent, for example in twin-screw evaporation extruders at temperatures of 200° to 250°.

Organic solvents which are suitable for the preparation of the polycarbonates according to the invention are the known solvents for thermoplastic polycarbonates, such as, for example, methylene chloride and chlorobenzene.

Basic compounds which are suitable for the preparation of the aqueous alkaline phase are LiOH, NaOH, KOH, Ca(OH)$_2$ and/or Ba(OH)$_2$.

Catalysts which are suitable for the polycondensation reaction are the tertiary aliphatic amine catalysts known for polycarbonate synthesis, such as trimethylamine, triethylamine, n-tripropylamine, n-tributylamine or N-ethylpiperidine. If appropriate, the known quaternary ammonium salts, such as, for example, tetrabutylammonium bromide, can also be used.

The amount of catalyst used depends on the diphenol employed, while generally from 0.2 to 5 mol % are sufficient, when tetramethyl-substituted diphenols are used, 5 to 10 mol % are required. The amounts in each case are relative to the total amount of diphenols used in the total aromatic polycarbonate content in the polycarbonate elastomers.

The amounts of organic phase are selected such that the reaction is carried out in a 5 to 20 percent strength organic solution, preferably in a 10 to 15 percent strength organic solution.

While the volume of aqueous alkaline phase is preferably equal to the overall volume of organic phase, it can also be larger or smaller than that volume.

The pH value of the aqueous phase during the reaction is between 9 and 14, preferably between 12 and 13.

2. Preparation of a polycarbonate according to the invention in a homogeneous phase system (pyridine process).

In this process diphenols and the dimeric fatty acid esters which are suitable according to the invention, if appropriate together with trifunctional or tetrafunctional branching agents, are dissolved in an organic base, such as, for example, pyridine, into which methylene chloride is optionally admixed. After adding a suitable solvent for the polycarbonates formed, phosgene is passed into the mixture at a temperature between 0° C. and 60° C. The pyridine hydrochloride which forms during the reaction is filtered off and the organic phase is washed with dilute aqueous HCl, and then with water to neutrality. The organic solution of the polycarbonate is worked up as in the process described under 1.

In addition to pyridine, organic bases which are suitable are triethylamine, dimethylaniline and tributylamine. Solvents for the polycarbonate according to the invention are those listed for the process described under 1.

The amounts of organic phase are chosen such that the reactions can be carried out in an approximately 5 to 20 percent strength solution.

The amounts of organic bases are chosen such than more than 2 mols of amine are used per mol of diphenol or phosgene employed.

The particular ratios between the diphenol and the dimeric fatty acid esters which can be used according to the invention depend on the desired content of "soft segment" (dimeric fatty acid ester units) and that of the "hard segment" (aromatic carbonate units).

Carbonate sources for the preparation, according to the invention, of the polycarbonates are carbonic acid halides, in particular carbonic acid chlorides, such as, for example, phosgene and COBr$_2$, or bischlorocarbonic acid esters of the diphenols. The amount used is in each case less than ½ mol of diphenol per halogeno-carbonic acid group.

The polycarbonates according to the invention consist of aromatic polycarbonate portions and dimeric fatty acid ester segments. The hardness and heat distortion temperature of the polycondensates increase and the elasticity and elongation at break decrease as the content of the aromatic polycarbonate increases.

The polycarbonates according to the invention which contain more than about 5% by weight of co-condensed dimeric fatty acid ester segments can also be termed polycarbonate elastomers. Their aromatic polycarbonate content is to be understood as the amount by weight of aromatic carbonate structural units of the following formula (III)

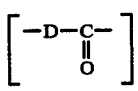
(III)

wherein
D represents the diphenolate radicals in the polycarbonate elastomer,
and in particular, of aromatic carbonate structural units of the formula (IV)

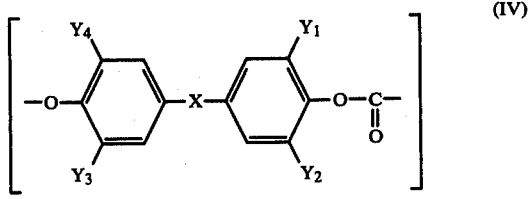
(IV)

wherein
X and $Y_1$ to $Y_4$ have the meaning given in the case of the formula (I).

The soft segment content of the high-molecular polycarbonate elastomers according to the invention is to be understood as the amount by weight of the aliphatic carbonate structural units represented by (V) or carboxylate structural units represented by (VI)

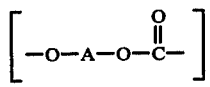
(V)

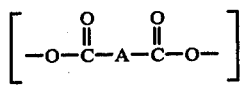
(VI)

wherein
—O—A—O— denotes the bivalent diolate radical as defined in formula (II) and

is the bivalent dicarboxylate radical of the dimeric fatty acid esters which are suitable according to the invention and contain aliphatic carboxyl end groups and have a $\overline{M}n$ (number-average) of 800 to 20,000, preferably 1,000 to 15,000 and in particular 2,000 to 10,000.

The present invention thus preferably relates to high-molecular, segmented, thermoplastically processable, aromatic polycarbonates based on co-condensed dimeric fatty acid ester segments which consist of about 30 to 99 percent by weight, of aromatic carbonate structural units of formula (IV) and of 70 to 1 percent by weight of dimeric fatty acid ester segments of formula (V) or of formula (VI).

A particular relation, that of 30 to 95 percent by weight, preferably 35 to 80 percent by weight of formula (IV) and 70 to 5 and preferably 65 to 20 percent by weight of formula (V) or of formula (VI) is preferred. Further preferred is an embodiment consisting of 95.1 to 99 percent by weight, most preferred 90 to 99 percent by weight, of formula (IV) and 4.9 to 1 percent by weight, and most preferred 4 to 1 percent by weight of formula (V) or of formula (VI).

In addition to a particularly good thermal stability, the high-molecular, segmented thermoplastically processable polycarbonates according to the invention exhibit good transparency and, in proportion to the content of soft segment, high elasticity.

The high-molecular polycarbonates according to the invention should have average molecular weights Mw (weight-average) of 25,000 to 200,000, preferably of 40,000 to 150,000, determined by the light scattering method with a dispersion photometer. The relative solution viscosities $\eta_{rel}$ (measured on solutions of 0.5 g of polycarbonate in 100 ml of $CH_2Cl_2$ at 25° C.) of the high-molecular polycarbonates according to the invention are between 1,2 and 3, preferably between 1,25 and 3, especially between 1,4 and 2,6.

In addition to the dimeric fatty acid esters which are suitable according to the invention, other "soft segments" which are capable of being incorporated can be used for the preparation of the polycarbonates according to the invention. Examples of such soft segments are those which are already used and are based on polyethers, polyesters, polyacetals and polythioethers, in German Patent Application P 28 37 526, or based on aliphatic polycarbonates, in German Patent Application P 28 27 325, or obtained from polysiloxanes, in accordance with U.S. Pat. No. 3,189,662 and German Offenlegungsschrift 2,411,123, or from C—C linked polymers, in accordance with German Offenlegungsschrift 2,702,626. Such polycarbonate elastomers of the prior art can be substantially improved, in terms of phase separation and reduced tendency to tackiness, by co-condensing small amounts of the dimeric fatty acid ester soft segments according to the invention.

The polycarbonates according to the invention can also be admixed with high-molecular polycarbonate elastomers based on polyethers, polyesters, polysiloxanes, polythioethers, polyacetals, aliphatic polycarbonates and C—C linked polymers, resulting in an improvement in their properties, such as, for example, phase separation and reduced tackiness.

The polycarbonates according to the invention can furthermore also be admixed with other thermoplasts, for example bisphenol-A polycarbonates. Such polycarbonates, suitable as components, have preferably an $\eta_{rel.}$ (determined at 20° C. in $CH_2Cl_2$, c=0.5 g/l) between about 1,2 and 1,45 and can have been made in known manner besides from the already mentioned 2,2-Bis-(4-hydroxyphenyl)-propane also from the other diphenols of formula (I).

In addition to being used as packaging materials for biological liquids and parenteral agents, the polycarbonate elastomers according to the invention containing at least 5% by weight of co-condensed dimeric fatty acid esters as the soft segments can advantageously be used in all cases where a combination of hardness and elasticity, in particular low temperature flexibility, is desired, for example in bodywork construction, for the production of low-pressure tires for vehicles, for sheathings for tubes, sheets and pipes and for flexible disc pulleys.

The packaging materials are produced from the polycarbonate elastomers which are suitable according to the invention and contain at least 5% by weight of co-condensed dimeric fatty acid esters as the soft segments by known processing methods for thermoplastic polymers, for example by the extrusion process under customary processing conditions.

Extruded films can be processed to flexible bags by heat-sealing, heat impulse welding, ultrasonic welding or high frequency welding. After filling and steam sterilization, these bags pass the necessary drop tests.

Extruded flat films of the material according to the invention have very good optical properties (light transmission: 90%, turbidity:2%), excellent mechanical properties (tensile strength: about 20 MPa, elongation at break: about 700%) and low temperature flexibility and an extremely low content of extractable constituents.

The polycarbonates according to the invention containing less than about 5% by weight of co-condensed dimeric fatty acid esters can be used for applications for which customary thermoplastic polycarbonates are used, for example as films and sheets in the electrical industry. Such manufactured parts can be produced by the extrusion and injection-molding processes suitable for aromatic polycarbonates.

Compared with comparable thermoplastic polycarbonates without co-condensed dimeric fatty acid esters, the polycarbonates according to the invention containing less than about 5% by weight of co-condensed dimeric fatty acid esters have the advantages of having a higher low-temperature-impact-strength and of being released from the mold more easily after thermoplastic processing.

The polycarbonates according to the invention containing co-condensed dimeric fatty acid esters and between about 30% by weight and 99% by weight of aromatic carbonate structural units can be mixed with suitable additives customary in the technology of thermoplastic polyesters and of aromatic, thermoplastic polycarbonates, such as, for example, carbon black, kieselguhr, kaolin, clays, $CaF_2$, $CaCO_3$, aluminum oxides and customary glass fibers, in amounts of 2 to 4% by weight, in each case relative to the total weight of the molding composition, and with inorganic pigments, both as fillers and as nucleating agents.

The stability of the aromatic polycarbonates according to the invention containing co-condensed dimeric fatty acid esters to UV light and hydrolysis can be improved by UV stabilizers, such as, for example, substituted "benzophenones" or "benztriazoles", in amounts customary for thermoplastic polyesters and aromatic polycarbonates, by hydrolysis stabilizers, such as, for example, monocarbodiimides and, mostly, polycarbodiimides (compare W. Neumann, J. Peter, H. Holtschmidt and W. Kallert, Proceeding of the 4th Rubber Technology Conference, London, 22nd–25th May 1962, pages 738–751), in amounts of 0.2–5% by weight, relative to the total weight of the molding composition, and by the antiaging agents and stabilizers known in the chemistry of thermoplastic polyesters and of aromatic, thermoplastic polycarbonates.

If flame-resistant molding compositions are desired, about 5 to 15% by weight, in each case relative to the weight of aromatic polycarbonates containing dimeric fatty acid esters, of flameproofing agents known in the chemistry of thermoplastic polyesters and of aromatic, thermoplastic polycarbonates, such as, for example, antimony trioxide tetrabromophthalic anhydride, hexabromocyclododecane, tetrachloro- or tetrabromo- bisphenol-A, tris-(2,3-dichloropropyl) phosphate or tetrachloro- or tetrabromo-phthalimides can be admixed to the polycarbonates, the tetrachloro- and tetrabromo-bisphenols statistically co-condensed in the polycarbonate portions of the aromatic polycarbonates according to the invention likewise exhibit flame-resistant properties.

Processing auxiliaries, such as mold-release agents, known in the chemistry of thermoplastic polyesters and of thermoplastic, aromatic polycarbonates can also be used effectively.

The average molecular weights given in the examples which follow are number-average ($M_n$) and are established by determining the OH number and the acid number.

The viscosity of the prepolymer soft segments of Examples A and B is determined at 20° in a flow cup 4 DIN 53 211 from Messrs. Erichsen.

The relative solution viscosity $\eta_{rel}$ of Examples C 1-9 is defined as the viscosity of 0.5 g of the high-molecular polycarbonate in 100 ml of methylene chloride at 25°.

Investigations by gel chromatography were carried out at room temperature in tetrahydrofurane using Styragel columns (separation range: $1.5 \times 10^5$ Å, $1 \times 10^5$ Å, $3 \times 10^4$ Å and $2 \times 10^3$ Å).

The calibration of bisphenol-A polycarbonate was used for the determination. No large deviations were found compared with the $M_w$ determination by the light scattering method.

EXAMPLES

Example A 1

Preparation of a dimeric fatty acid polyester containing aliphatic OH end groups and having a calculated molecular weight of about 2,000

20.16 kg (36 mols) of dimeric fatty acid are mixed with 5.664 kg (48 mols) of 1,6-hexanediol and the mixture is heated to 150° under nitrogen (30 l/hour). Above 150°, condensation water starts to distill off over a column. The temperature is increased to 200° C. in the course of 5 hours and the mixture is left at this temperature for two additional hours. After adding 0.258 g of $SnCl_2 . 2H_2O$, the supply of nitrogen is discontinued and the pressure is reduced gradually to 50 mm Hg in the course of 3 hours. After an additional 7 hours at 200° and under 50 mm Hg, the condensation reaction has ended.

An oil with a OH number of 57 (calculated: 54.9) and an acid number of 1.9, corresponding to an average molecular weight of about 1,900, is obtained. The viscosity of this oil as a 50 percent strength solution in xylene is 19 seconds (measured in a DIN 53 211 flow cup No. 4).

Example A 2

Preparation of a dimeric fatty acid polyester containing aliphatic OH end groups by azeotropic esterification 20.16 kg (36 mols) of dimeric fatty acid, 5.664 kg (48 mols) of 1,6-hexanediol and 4 kg of xylene are mixed and the mixture is slowly heated to a reflux temperature of 180°, under nitrogen and while stirring. Most of the water of condensation can be separated off by a water separator in the course of 6 hours. After adding 0.258 g of $SnCl_2 \cdot 2H_2O$, the mixture is heated under reflux for an additional 8 hours, until all of the water of condensation has been separated off. All the xylene is then distilled off under reduced pressure. An oil with an OH number of 57 (calculated: 54.9) and an acid number of 1.9, corresponding to an average molecular weight of about 1,900, is obtained. The viscosity of this oil as a 50 percent strength solution in xylene is 19 seconds.

Example A 3

Preparation of a dimeric fatty acid polyester containing aliphatic OH end groups and having a calculated molecular weight of about 4,000

4.368 kg (7.8 mols) of dimeric fatty acid, 1.074 kg (9.1 mols) of 1,6-hexanediol and 0.85 kg of xylene are heated under reflux, while stirring, according to Example A 2. After adding 0.056 g of $SnCl_2 \cdot 2H_2O$, the process is continued as in Example A 2. The resulting oil has an OH number of 30 (calculated: 28.3) and an acid number of 1, corresponding to an average molecular weight of 3,600. The viscosity of this oil as a 50 percent strength solution in xylene is 29 seconds.

EXAMPLE A 4

Esterification of dimeric fatty acid with an excess of 1,6-hexanediol 5.6 kg (10 mols) of dimeric fatty acid and 3.54 kg (30 mols) of 1,6-hexanediol are subjected to a condensation reaction according to Example A 1, using 0.092 g of $SnCl_2 \cdot 2H_2O$ as the catalyst.

The resulting oil has an OH number of 255 (calculated: 255) and an acid number of 2.

The viscosity of this oil as a 50 percent strength solution in xylene is 15.8 seconds.

Example A 5

Preparation of a dimeric fatty acid polyester containing COOH end groups and having a calculated molecular weight of about 3,000.

3.64 kg (6.5 mols) of dimeric fatty acid and 0.614 kg (5.2 mols) of hexanediol are subject to a condensation reaction according to Example A 1, 0.043 g of $SnCl_2 \cdot 2H_2O$ being added as the catalyst.

The resulting oil has an acid number of 37 (calculated: 35.9) and an OH number of 1.5, corresponding to an average molecular weight of 2,910.

The viscosity of this oil as a 50 percent strength solution in xylene is 15 seconds.

Example B 1

Preparation of a polyester of dimeric fatty acid and hexanediol containing diphenol carbonate end groups of 2,2-bis-(4-hydropyphenyl)-propane (bishpenol-A) and having a calculated molecular weight of about 2,500

A mixture of 9.9 kg (4.84 mols) of the polyester of dimeric fatty acid and hexanediol from Example A 1, 2.074 kg (9.68 mols) of diphenyl carbonate and 2.21 kg (9.68 mols) of bisphenol-A is initially introduced into an autoclave. The mixture is melted at 100°, while compensating the pressure with nitrogen. 1.54 ml of 40 percent strength NaOH ($\triangleq$ 35 ppm of Na, relative to the weight of materials used) are added to this melt as a catalyst. The pressure is now slowly reduced to 1-1.5 mm Hg in the course of 1 hour. Thereafter, the reaction mixture is heated to an internal temperature of 150° in the course of 1 hour, until the phenol formed has distilled off. The reaction mixture is kept at this temperature and under 1-1.5 mm Hg for an additional 2 hours, until most of the phenol has been split off. Thereafter, a vacuum of 0.5 mm Hg is applied and the condensation reaction is continued at 150° for 2 hours. When the reaction has ended, 1.793 g of phenol (98.4% of theoretical) have been distilled off.

The oil isolated has an OH number of 46 (calculated: 44) and an acid number of 1, corresponding to an average molecular weight Mn of 2,383.

The viscosity of the isolated oil as a 50 percent strength solution in xylene is 70 seconds (measured in a DIN 53 211 flow cup No. 4).

Example B 2

Preparation of a polyester of dimeric fatty acid and hexanediol containing diphenol carbonate end groups of bishpenol-A and having a calculated molecular weight of about 2,500

9.9 kg (4.84 mols) of the polyester of dimeric fatty acid and hexanediol from Example A 2 (prepared by azeotropic esterification), 2.074 kg (9.68 mols) of diphenyl carbonate, 2.21 kg (9.68 mols) of bisphenol-A and 1.54 ml of 40 percent strength NaOH are reacted analogously to Example B 1.

After distilling off 1.800 kg (98.8% of theoretical) of phenol, an oil with an OH number of 46 (calculated: 44) and an acid number of 1, corresponding to an average molecular weight Mn of 2,383, is obtained.

The viscosity of this oil as a 50 percent strength solution in xylene is 70 seconds.

Example B 3

Preparation of a polyester of dimeric fatty acid and hexanediol containing diphenol carbonate end groups of 2,2-bis-(4-hydroxyphenyl)-propane (bisphenol-A) and having a calculated molecular weight of about 4,400

4.61 kg (1.16 mols) of dimeric fatty acid polyester from Example A 3, 0.497 kg (2.32 mols) of diphenyl carbonate, 0.530 kg (2.32 mols) of bisphenol-A and 0.6 ml of 40 percent strength NaOH ($\triangleq$ 35 ppm of Na, relative to the weight of materials used) are reacted analogously to Example B 1. After distilling off 421 g of phenol (96.3% of theoretical), an oil with an OH number of 27 (calculated: 25) and an acid number of 1, corresponding to an average molecular weight Mn of 4,000, is obtained.

The viscosity of this oil as a 50 percent strength solution in xylene is 182 seconds.

Example B 4

Preparation of an aliphatic polyester-polycarbonate of dimeric fatty acid and hexanediol containing diphenol carbonate end groups and having a calculated molecular weight of about 3,200

6.24 kg of the mixture of 1,6-hexanediol and the ester of dimeric fatty acid and hexanediol from Example A 4, 3,551 kg (16.6 mols) of diphenyl carbonate, 1.082 kg (4.74 mols) of bisphenol-A and 1.7 ml of 40 percent strength NaOH ($\triangleq$ 50 ppm of Na, relative to the weight of materials used) are reacted analogously to Example B 1. After splitting off 3.115 kg of phenol (99.8% of theoretical), an oil with an OH number of 35 (calculated: 34.3), corresponding to an average molecular weight Mn of 3,200, is obtained.

The viscosity of this oil as a 50 percent strength solution in xylene is 114 seconds.

Example C 1

Preparation of a high-molecular, segmented polycarbonate elastomer consisting of 55% by weight of a polyester of dimeric fatty acid and hexanediol (molecular weight: about 2,000) and 45% by weight of bisphenol-A polycarbonate 3.094 kg of the precursor from Example B 1 are dissolved in 30 l of methylene chloride and the solution is added to a solution of 1.265 kg (5.54 mols) of bisphenol-A, 29.89 g of p-tert.-butylphenol, 1.415 kg of 45 percent strength NaOH and 30 l of distilled water. 1.181 kg (11.95 mols) of phosgene are passed in at 20°-25° in the course of 25 minutes, while stirring and under a nitrogen atmosphere. During the introduction, 2.22 kg of 45 percent strength NaOH are simultaneously added dropwise such that the pH value remains constant at 13. After passing in the phosgene, 8.05 g of triethylamine are added and the mixture is stirred for 1 hour.

The organic phase is separated off and washed first with 2 percent strength phosphoric acid and then with distilled water, until free from electrolytes. After separating off the water, the organic solution is concentrated. The high-molecular, segmented polycarbonate elastomer is isolated by extrusion in an evaporation extruder at about 230°-250° under the conditions known for polycarbonate extrusion.

The analytical data for the polycarbonate elastomer are: relative viscosity (0.5% strength in $CH_2Cl_2$): $\eta_{rel}=1.53$; Mn: 15,637; Mw: 123,626; H (heterogeneity):6.91.

Differential thermoanalysis (DTA) of this product shows that phase separation of the soft segment consisting of the polyester of dimeric fatty acid and hexanediol (glass transition temperature: $-50°$) from the bisphenol-A polycarbonate hard segment (glass transition temperature: about 135°-140°) is present both during the first heating and during the second heating.

The material obtained is in the form of odorless, free-flowing granules suitable for further processing, for example, into extruded films. Production and testing of fine films of the polycarbonate elastomers according to the invention:

The resulting granules were extruded at between 200°and 250° C. to yield flat films 200 μm thick.

Optical measurements on the extruded films gave light transmissions of up to 90% and turbidities of only 2%.

Tensile strength: 20 MPa, measured in accordance with the method of DIN 53 504

Elongation at break: 700%, measured in accordance with the method of DIN 53 504

Tear propagation resistance according to Graves: 25 kN/m

Flexible bags were produced from the films by means of heat impulse welding and were filled with 1 liter of water and subjected to steam sterilization in accordance with the method of DIN 58 946, Part 1,IIe. The bags passed subsequent drop tests in accordance with the method of DIN E 58 361, Part 4.The films produced with the material according to the invention meet the chemical requirements of transfusion containers in accordance with DIN E 58 361, Part 4.

Permeability to steam, based on a thickness of 100 μm: 18 $g.m^{-2}.d^{-1}$.

The present bags exhibit an exceptionally good low temperature flexibility.

Example C 2

Preparation of a high-molecular, segmented polycarbonate elastomer consisting of 55% by weight of a polyester of dimeric fatty acid and hexanediol (molecular weight: about 2,000/prepared by azeotropic esterification) and 45% by weight of bisphenol-A polycarbonate A high-molecular polycarbonate elastomer was prepared from 3.094 kg of the precursor from Example B 2, 1.265 kg of bisphenol A, 29-89 g of p-tert.-butylphenol and 1.181 kg of phosgene analogously to Example C 1. The properties of the product otherwise correspond to those of the product from Example C 1. The relative viscosity $\eta_{rel}$ of this product is 1.53.

Example C 3

Preparation of a high-molecular polycarbonate elastomer consisting of 55% by weight of a polyester of dimeric fatty acid and hexanediol (molecular weight: about 4,000) and 45% by weight of bisphenol-A polycarbonate 2.794 kg of the precursor from Example B 3 are dissolved in 30 liters of methylene chloride and the solution is added to a solution of 1.532 kg (6.7 mols) of bisphenol-A, 41.85 g of p-tert.-butylphenol and 1.415 kg of 45 percent strength NaOH and 30 liters of distilled water. 1.181 kg of phosgene are passed in at 20°-25° in the course of 25 minutes, while stirring and under a nitrogen atmosphere. During this introduction, the pH value is kept constant at 13 with 2.22 kg of 45 percent strength NaOH. After adding 8.05 g of triethylamine, the mixture is worked up as in Example C 1.

The analytical data of the polycarbonate elastomer are: relative viscosity (0.5% strength in $CH_2Cl_2$): $\eta_{rel}=1.49$; Mn: 10,878; Mw: 115,034; H (heterogeneity): 9.57.

Differential thermoanalysis of this product shows that a phase separation of the soft segment consisting of the polyester of dimeric fatty acid and hexanediol (glass transition temperature: $-50°$) from the hard segment (glass transition temperature: about 135°-140°) is present both during the first heating and during the second heating.

Example C 4

Preparation of a high-molecular, segmented polycarbonate elastomer consisting of 55% by weight of an aliphatic dimeric fatty acid ester-polycarbonate (molecular weight: 2,600) as the soft segment and 45% by weight of bisphenol-A polycarbonate 3.089 kg of the precursor from Example B 4 are dissolved in 30 liters of methylene chloride and the solution is added to a solution of 1.406 kg of bisphenol-A, 29.9 g of p-tert.-butylphenol and 1.415 kg of 45 percent strength NaOH, and 30 liters of distilled water. The reaction is continued using the same amounts of phosgene, sodium hydroxide solution and triethylamine as in Example C 1 and under the reaction conditions of Example C 1.

The relative viscosity $\eta_{rel}$ of the polycarbonate elastomer containing dimeric fatty acid units is 1.70. Differential thermoanalysis shows that a phase separation of the soft segments (glass transition temperature: $-40°$)

from the hard segment (glass transition temperature: about 130°–140°) is present both during the first heating and during the second heating.

Example C 5

Preparation of a polycarbonate elastomer from a dimeric fatty acid polyester containing carboxyl end groups (molecular weight: about 3,100), bisphenol-A and phosgene A solution of 13.75 g of the polyester, from Example A 5 of dimeric fatty acid and hexanediol containing carboxyl end groups and 225 g of methylene chloride is added to a solution of 10.09 g of bisphenol-A, 44.2 ml of 2N NaOH and 130 ml of distilled water. 10.45 g of phosgene are passed in at 20°–25° in the course of 20 minutes, while stirring and under a nitrogen atmosphere, and at the same time 37 g of 45 percent strength NaOH are added dropwise in order to maintain a constant pH of 13. After passing in the phosgene, 7.3 ml of a 1 percent strength triethylamine solution are added and the mixture is stirred for 1 hour. The organic phase is separated off and washed successively with distilled water until free from electrolytes. After concentrating, the residue is dried in a vacuum drying cabinet at 50° and under 15 mm Hg for 12 hours.

The relative viscosity $\eta_{rel}$ of the product is 1.61.

Example C 6

Preparation of a polycarbonate elastomer from the bischlorocarbonic acid ester of a dimeric fatty acid polyester, bisphenol-A and phosgene by the phase boundary process 4 g of phosgene are passed into a solution of 13.75 g of the polyester of dimeric fatty acid and hexanediol of Example A 1 and 225 g of methylene chloride. After stirring the mixture for 5 minutes, a solution of 10.09 g of bisphenol-A, 44.2 ml of 2N NaOH, 130 ml of distilled water and, as a catalyst, a mixture of 0.08 g of tributylamine and 0.14 g of tetrabutylammonium bromide is added. After stirring the reaction mixture for a further period of 5 minutes, 6.59 g of phosgene are passed in over a period of 15 minutes, and at the same time 27 g of 45 percent strength NaOH are added dropwise in order to maintain a constant pH of 13. After passing in the phosgene, the mixture is stirred for an additional hour and worked up as described in Example C 5.

The relative viscosity $\eta_{rel}$ of the product is 1.31.

4.5 ml of a 1 percent strength triethylamine solution can also be equally successfully employed as a catalyst in the reaction, analogously to the catalyst combination of tetrabutylammonium bromide and triethylamine.

The relative viscosity $\eta_{rel}$ of the product is 1.32.

Example C 7

Preparation of a polycarbonate elastomer from a dimeric fatty acid polyester containing aliphatic hydroxyl end groups, bisphenol-A and phosgene by the pyridine process 10.09 g of bisphenol-A are dissolved in 170 g of pyridine, under a nitrogen atmosphere. A solution of 13.75 g of the polyester of dimeric fatty acid and hexanediol of Example A 2 and 225 g of methylene chloride is added to that solution. 5.1 g of phosgene are then passed into this reaction solution in the course of 20 minutes while stirring. The reaction mixture formed is stirred for a further period of one hour. The pyridine hydrochloride formed during the reaction is then filtered off and the organic phase is washed twice with 10 percent strength hydrochloric acid. Thereafter, the organic phase is washed with distilled water until free from electrolytes. The product is isolated according to Example C 5

The relative viscosity $\eta_{rel}$ of the polycarbonate elastomer is 1.33.

Example C 8

Preparation of a segmented, aromatic polycarbonate consisting of 20% by weight of a polyester of dimeric fatty acid and hexanediol (molecular weight: about 2,000) and 80% by weight of bisphenol-A polycarbonate 6.25 g of the precursor from Example B 1 are dissolved in 225 g of methylene chloride and that solution is added to a solution of 16.83 g of bisphenol-A, 0.378 g of p-tert.-butylphenol, 78.5 ml of 2N NaOH and 90 g of distilled water. 11.7 g of phosgene are passed in at 20°–25° in the course of 20 minutes, while stirring and under a nitrogen atmosphere. During this introduction, the pH value is kept constant at 13 by the addition of 16 g of 45 percent strength NaOH. After adding 8 g of a 1% strength triethylamine solution, the mixture is stirred for an additional hour. The product is isolated according to Example C 5.

The relative viscosity $\eta_{rel}$ of the segmented, aromatic polycarbonate is 1.34.

Differential thermoanalysis shows that a phase separation of the soft segment (glass transition temperature: −52° C.) from the aromatic polycarbonate hard segment (glass transition temperature 135° C.) is present both during the first heating and during the second heating.

Example C 9

Preparation of an aromatic polycarbonate consisting of 3% by weight of a polyester of dimeric fatty acid and hexanediol (molecular weight: about 2,000) and 97% by weight of bisphenol-A polycarbonate 0.94 g of the precursor from Example B 1 is dissolved in 225 g of methylene chloride and then added to a solution of 21.6 g of bisphenol-A, 0.458 g of p-tert.-butylphenol, 95 ml of 2N NaOH and 75 g of distilled water. 14.15 g of phosgene are passed in at 20°–25° C. in the course of 20 minutes, while stirring and under a nitrogen atmosphere. During this introduction, the pH value is kept constant at 13 by the addition of 22 g of 45% strength NaOH. After adding 9.5 g of a 1% strength triethylamine solution, the mixture is stirred for a further period of one hour. The product is isolated according to Example C 5.

The relative viscosity $\eta_{rel}$ of the aromatic polycarbonate is 1.30.

What is claimed is:

1. In a two-phase interfacial process for preparing high-molecular weight, thermoplastically processable aromatic polycarbonates, the improvement comprising co-reacting dimeric saturated fatty acid esters characterized by hydroxyaryl carbonate end groups of the formula

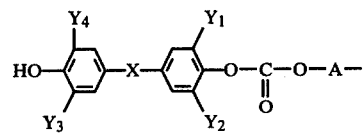

-continued

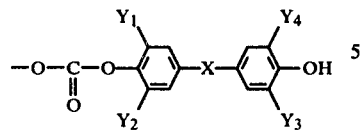

wherein

—O—A—O— is a bivalent diolate radical of an aliphatic dimeric saturated fatty acid ester having hydroxyl end groups and a number-average molecular weight of 1,000 and 15,000

X is a single bond, —CH$_2$—,

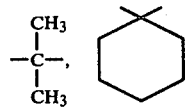

—O—, —S—, —SO$_2$—, or

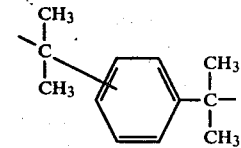

and Y$_1$ to Y$_4$, independently denote hydrogen, C$_1$ to C$_4$ alkyl or a halogen atom with diphenols, monophenolic chain stoppers and carbonic acid halides, said polycarbonates being characterized in that they contain between 5 and 70 weight percent of segments derived from said esters.

2. The process of claim 1 wherein said molecular weight is between 2,000 and 10,000.

3. The high-molecular weight, thermoplastically processable aromatic polycarbonate produced by the process of claim 1 or 2.

4. Packaging films comprising the polycarbonate compound of claim 3.

5. Shaped articles comprising the polycarbonate compound of claim 3.

6. The process of claim 1 wherein said polycarbonates contain between 20 and 65 percent by weight of said segments.

7. The process of claim 6 wherein said number average molecular weight is between 2000 and 10,000.

* * * * *